March 12, 1935.  T. C. ARNOLD  1,993,987
SEALING DEVICE
Filed Aug. 30, 1933
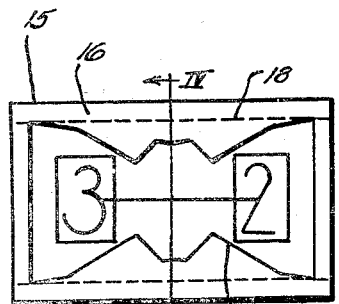
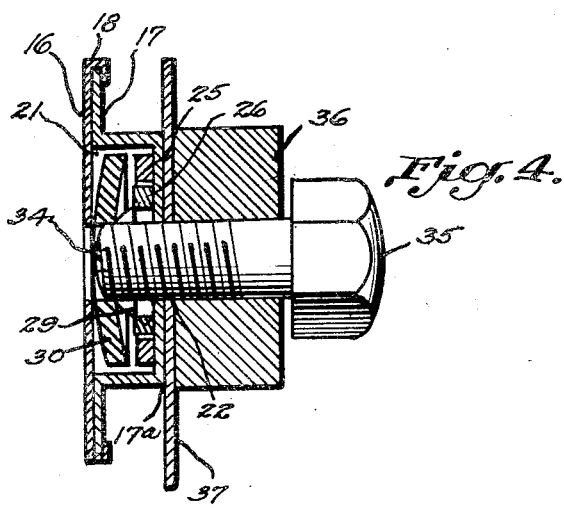
Thomas C. Arnold,
INVENTOR.
BY K. Wilson Corder.
ATTORNEY Patented Mar. 12, 1935

1,993,987

UNITED STATES PATENT OFFICE 1,993,987

SEALING DEVICE

Thomas C. Arnold, Quincy, Fla., assignor of one-half to Arthur Corry, Quincy, Fla.

Application August 30, 1933, Serial No. 687,419

6 Claims. (Cl. 151—33)

This invention relates to sealing devices, and more particularly to a new and improved implement for attaching automobile tags to their supporting brackets in such a manner that once attached, the tag cannot be removed, as for the purpose of changing it to another car, without either destroying the seal, or the tag, or both. It is obvious that my invention may also be used for other purposes, as for sealing meters, meter cabinets, and the like. In short, it is intended to be used wherever it is desirable to securely attach or unite one element to another in such a manner that the elements cannot be separated without damage of such a nature as to be at once discernible to an inspector or even to a casual observer.

Heretofore, devices of this character have been proposed, but these have proven unsatisfactory for a number of reasons, the chief objection being that they may be adjusted in such a manner as to render useless the purpose for which they are intended. For instance, one device of this type employs a bolt, the head of which is so formed and shielded that it may only be rotated in one direction, and joining the bolt on the back of the device is a nut with a lug upon its inner end adapted to engage within the slot of a supporting bracket, the theory being that once securely in place, the bolt cannot be withdrawn. However, it is only necessary to file or grind the lug off the nut before installing the device, to make removal a simple matter of unscrewing the nut whenever desired. Such an expedient is frequently resorted to by unscrupulous persons intending to change a tag from car to car, or even by honest citizenry who opine they may wish to make such a change during the course of the year.

Another device of this type employs a sliding piece of metal having prongs or tabs which are supposed to engage corresponding perforations in a hollow channel in which they are inserted, and once thus engaged, become impossible to withdraw, and thus permanently fix the tag to its support. Unfortunately, such pieces of metal may either be beaten flat before insertion, and thus by eliminating the tabs, forestall the purpose for which they are intended; or, once properly inserted, may still be withdrawn by inserting a second flat piece of metal into the channel and by using this as a guide, slide the initial locking strip from its place and then remove the tag. In short, devices now on the market are easily circumvented, and do not accomplish the purposes for which they are intended.

An object of this invention is to provide means for attaching license plates to automobiles and the like in such a manner that they cannot be removed without destroying the seal.

Another object is to make a device of this character, fool-proof.

A still further object is to provide a sealing device of this nature subject to a wide variety of uses.

A still further object is to provide cheapness of manufacture in a device of this character.

Another object is to provide a sealing means that can be quickly and easily attached, and which once attached, can be removed only with destruction to its face of such a nature that such damage cannot be repaired or concealed.

These and other objects made apparent throughout the further course of this specification are accomplished by means of my special sealing device, a full understanding of which is made possible by reference to the drawing herein, in which:

Fig. 1 is a front view of my device with its face removed and certain attaching elements absent.

Fig. 2 is a cross-sectional view of the structure illustrated in Fig. 1, taken along the line II—II thereof, looking in the direction of the arrows.

Fig. 3 is a front view of my device in assembled form, showing the face thereof.

Fig. 4 is an enlarged vertical cross-sectional view of the device shown in Fig. 3, taken along the line IV—IV thereof.

Fig. 5 is a top plan view of the lock-nut employed in connection with my device.

Fig. 6 is a side view of said lock-nut.

Fig. 7 is a top plan view of the lock-washer employed in my device.

Fig. 8 is a side view of said lock-washer.

Fig. 9 is a top plan view of the special retaining element employed in connection with my device.

Fig. 10 is a side view of said retaining element.

Fig. 11 is a side view of the bolt employed in connection with my invention.

Fig. 12 is a top plan view of the bolt illustrated in Fig. 11.

Referring now to the drawing, 15 indicates the body of my sealing device, which is composed of two thicknesses of metal, an outer thickness 16 and an inner one 17, which are united, as by being crimped and spot-welded along their outside edges 18. Upon the face of 16 may be any suitable indicating device, as the year, when the sealing means is employed in connection with an automobile tag; the name of the company and meter number when employed on a gas, electric, or water meter; or any other desired design, depending upon the specific use the device is being put to.

Near the outside edges of element 16 is indented a line 20, said line preferably being jagged in its course, as shown in the drawing, Fig. 3, and almost but not quite perforating the metal. The purpose of this indentation is to provide a point of breakage, should anyone attempt to tamper with the seal, said point or line being of such a nature that any stress of an unusual nature applied to the edges 18 of the seal will be directly transmitted thereto, with a result that the face of the seal will be broken in a ragged irregular manner, and in pieces, so that it will be practically impossible to restore the seal to its former condition, as might be done with a plain seal which could be removed and then soldered or otherwise put back into place again. In the instant structure, once removed, the face of the seal is ruined forever.

Between 16 and 17 is provided a suitable space 21 in which operate the locking elements of my invention, as will be explained during the further progress of this specification. Said space is provided by stamping a recess in the face of 17, as shown at 17a. A hole 22 is likewise punched or otherwise formed in the face of 17, and at stated intervals on either side of said hole are stamped or otherwise produced, two shoulders, 23 and 23a, said shoulders being of the same metal as 17, and standing at a height a little less than the thickness of 21, as shown in Fig. 2. Shoulders 23 and 23a are formed with bent ends 23b and 23c which operate with a ratchet-like effect; and wedged between shoulders 23 and 23a are two flat steel springs, 24 and 24a (Figs. 1 and 2), the operation of which elements is explained more fully elsewhere herein.

Within space 21 and over hole 22 is placed a lock-washer 25 (Figs. 7 and 8), which lock-washer may be of any conventional design, but which has a relatively large center opening, as indicated in the drawing, and within this opening rests a special retaining element 26 (Figs. 9 and 10).

Element 26 may be made of suitable metal, such as brass, and comprises a circular cone-shaped device having a hole 27 in its middle, and a slot 28 through its upper portion, said slot dividing this portion into two wings, 29 and 29a.

Completing the inner assembly of my sealing device is a lock-nut 30 (Figs. 5 and 6), said lock-nut preferably being of relatively large area, and round except for one or more notches, 31 and 31a formed in the side thereof, these notches having abrupt shoulders 32 and 32a more or less at right angles to the axis of the nut, and gradually ascending plane surfaces 33 and 33a arising from the indentations thus formed. Across the outside face of nut 30 and passing through the center thereof is a groove 34; and the nut is made slightly concave (Fig. 6), the purposes of these features appearing elsewhere herein.

To unite the various elements of my device, I employ a bolt 35 (Figs. 11 and 12), said bolt being of any standard design, the threads of which will engage those of lock-nut 30, and preferably being formed with an angular head, such as the hexagonal shape shown.

In operation my device works as follows: The various elements having been assembled during the process of manufacture, and the face 16 of the seal attached to the rear element 17 in a manner described heretofore, it is apparent that space 21 houses and securely contains lock-washer 25, retaining element 26, and lock-nut 30, it being further apparent that said elements are held directly in alignment over hole 22 through the agency of 17a at the top, bottom sides and back, 16 at the front, and shoulders 23 and 23a, the latter engaging notches 31 and 31a in conjunction with springs 24 and 24a. Bolt 35 is now passed through the hole of a supporting bracket 36 (Fig. 4), and that of a license plate 37, and hence into my seal through the opening 22 thereof, thus being brought into engagement with lock-nut 30, the notches 31 and 31a of which in turn engage 23b and 23c.

This cooperation of notches 31 and 31a with shoulders 23 and 23a and springs 24 and 24a, holds the nut 30 firmly against turning in a clock-wise direction (considering the device from the rear as bolt 35 is turned to the right), which arrangement makes it possible to tighten the nut without difficulty. In addition, the spring-like tension set up by lock-washer 25 serves to keep the nut from turning, thus tending to relieve the shoulders and springs from strain. As nut 30 is tightened, the edges of the rear face thereof tend to be forced outwardly, in view of the concave nature of the element; which tendency is further encouraged by the presence of slot or groove 34, it being apparent that as this operation proceeds, the nut binds more and more upon the end of bolt 35, the threads finally becoming so firmly wedged or locked therewith as to require a considerable force to loosen and remove the nut.

In this connection it is to be noted that while I have described a lock-nut in conjunction with my device, it is apparent that in view of the many safety features embodied in said device, including lock-washer 25, and the ratchet-like effect of springs 24 and 24a in cooperation with notches 31 and 31a, the lock-nut may be dispensed with and an ordinary notched article used, but in order to obtain the greatest possible efficiency, I deem it preferable to employ a lock-nut.

Attention is now called to retaining element 26, the structure of which has already been described, which element is intended to fit snugly upon bolt 35. As the face of nut 30 comes in contact with the wings 29 and 29a of 26 during the installation of my device, said wings are crushed upon the bolt, this action providing an effective collar or ring around bolt 35, which ring absolutely prevents the bolt's being withdrawn from hole 22. Slot 28 insures the prompt and effective collapse of the wings of 26 upon application of pressure thereto. As illustrated in the drawing (Fig. 4) bolt 35 has not sufficiently engaged nut 30 to effect this action, but the natural tension of wings 29 and 29a, with the threads of the bolt, makes withdrawal of the bolt difficult, and further tightening will make such impossible.

If desired, a hole may be placed in the face of 16 above the end of bolt 35, so that this element may pass through said opening and not tear out the face of the tag, as might happen if an irregular length bolt should be used to fasten the seal.

Having assembled my device in the foregoing manner, it is apparent that the seal is now securely in place, holding the license plate or other articles to which it is attached in an efficient and satisfactory manner. Should any attempt be made to remove the seal, as by unscrewing the bolt 35, nut 30 will immediately begin to turn in its place, there being nothing to keep it from turning counter-clockwise, shoulders 23 and 23a and springs 24 and 24a sliding over surfaces 33 and 33a of the nut when it is turned in such a direction, in contrast to the sharply engaging action of notches 31 and 31a when the force is applied in the opposite direction. Since the nut is securely locked upon the bolt 35 in the manner previously described herein, there is no possible way of getting it off without effectively holding the nut against a considerable torsional stress, which cannot be done without removing the face 16 of the seal, such an act immediately indicating tampering to even a casual observer, and subjecting the owner to penalty as provided by the law of a particular jurisdiction in which the device is used. As a further guarantee against the removal of bolt 35, there is provided detaining element 26, which, when collapsed upon bolt 35 in the manner described insures that the nut 30 will either turn within its space and not come off; or if its turning should be blocked in any manner, it will be forced upwardly and outwardly, tearing off the face 16 of the seal and indicating tampering, as aforesaid. This action may be compared to that of a screw-jack, ring 26 preventing the bolt from withdrawing, but the action of the threads of the bolt and nut forcing the nut up in the above-described manner.

My device may be used to fasten meter boxes and the like by reversing bolt 35, notching its head after the manner of nut 30, and putting said bolt in the place of said nut. The seal may then be screwed into any desired opening by rotating the entire element in a clock-wise direction, but once in place, it cannot be removed except by first removing the face 16 of the seal, an effective means of shielding the bolt head being provided thereby.

From the foregoing it is apparent that I have described a new and useful sealing device which is essentially fool-proof; that my device is economical to maufacture; efficient in action; and designed to fulfill a variety of needs and uses. While I have fully set forth and described one form of my invention, it is to be understood that I do not limit myself thereto, but assume that certain changes in form and structure, and omission of certain elements may be resorted to without departing from the scope of my invention. It is likewise understood that the appended claims are to be accorded a breadth in keeping with my contribution to this art.

I claim:

1. A sealing device comprising spaced outer and inner plates, said outer plate having lines of frangibility thereon and said inner plate having a central opening therein, inwardly extending shoulders associated with said inner plate, springs associated with said shoulders and plate, a notched lock-nut cooperating with said shoulders and springs, said lock-nut having a groove across the center axis of its face and being of slightly concave form, a lock-washer, a conical retaining element disposed between said plates and in alignment with said opening, and a bolt engaging said lock-nut and passing through said lock-washer and retaining element.

2. A sealing device comprising spaced outer and inner plates, said outer plate having lines of frangibility thereon and said inner plate having a central opening therein, inwardly extending shoulders associated with said inner plate, springs associated with said shoulders and plate, a notched lock-nut cooperating with said shoulders and springs to prevent the nut from being turned in but one direction, a lock-washer, a conical retaining element disposed between said plates and in alignment with said opening, and a bolt passing through said lock-washer and retaining element and engaging said lock-nut.

3. A sealing device comprising spaced outer and inner plates, said inner plate having a central opening therein, inwardly extending shoulders associated with said inner plate, springs associated with said shoulders and inner plate, a lock-nut, a lock-washer, and a conical retaining element disposed between said plates and in alignment with said opening, and a bolt passing through said lock-washer and retaining element and engaging said lock-nut.

4. A sealing device comprising spaced outer and inner plates, said inner plate having a central opening therein, an inwardly extending shoulder united with said inner plate, a spring associated with said shoulder and inner plate, a lock-nut, a lock-washer, a conical retaining element disposed between said plates and in alignment with said opening, said retaining element having a slot through the axis of its upper portion, and a bolt passing through said lock-washer and retaining element and engaging said lock-nut.

5. A sealing device comprising spaced outer and inner plates, said inner plate having a central opening therein, a lock-nut, a lock-washer, a conical retaining element disposed between said plates and in alignment with said opening, and a bolt engaging said lock-nut after first passing through said lock-washer and said retaining element.

6. A sealing device comprising spaced outer and inner plates, said inner plate having a central opening therein and being of greater length than the outer plate, inwardly extending shoulders formed in said inner plate, springs associated with said shoulders and plate, a notched lock-nut cooperating with said shoulders and springs in such a manner as to permit the nut to be turned in but one direction, said lock-nut having a groove across the center axis of its face, and being slightly concave in form, a lock-washer, and a conical retaining element disposed between said plates and in alignment with said opening, and a bolt passing through said lock-washer and retaining element and engaging said lock-nut.

THOMAS C. ARNOLD.